United States Patent
Seo

(10) Patent No.: US 7,440,687 B2
(45) Date of Patent: *Oct. 21, 2008

(54) STAGE APPARATUS AND CAMERA SHAKE CORRECTING APPARATUS USING THE STAGE APPARATUS

(75) Inventor: Shuzo Seo, Saitama (JP)

(73) Assignee: Hoya Corporation, Tokyo (JP)

( * ) Notice: Subject to any disclaimer, the term of this patent is extended or adjusted under 35 U.S.C. 154(b) by 361 days.

This patent is subject to a terminal disclaimer.

(21) Appl. No.: 11/275,438

(22) Filed: Jan. 3, 2006

(65) Prior Publication Data

US 2006/0146400 A1    Jul. 6, 2006

(30) Foreign Application Priority Data

Jan. 5, 2005 (JP) ............................. 2005-000327

(51) Int. Cl.
*G03B 17/00* (2006.01)
(52) U.S. Cl. .................. 396/55; 359/554; 333/1 M; 108/20; 108/143
(58) Field of Classification Search ............... 396/55, 396/153; 33/1 M; 108/20, 143; 359/554
See application file for complete search history.

(56) References Cited

U.S. PATENT DOCUMENTS

| | | | | |
|---|---|---|---|---|
| 4,171,657 A | * | 10/1979 | Halberschmidt et al. ...... | 83/886 |
| 4,320,943 A | * | 3/1982 | Link ........................ | 353/27 R |
| 4,995,277 A | * | 2/1991 | Yanagisawa ............ | 74/490.09 |
| 5,748,391 A | * | 5/1998 | Tanaka et al. ............... | 359/813 |
| 6,005,723 A | * | 12/1999 | Kosaka et al. ............... | 359/822 |
| 6,909,560 B2 | * | 6/2005 | Lin et al. .................... | 359/813 |
| 7,224,893 B2 | * | 5/2007 | Uenaka ....................... | 396/55 |
| 7,319,815 B2 | * | 1/2008 | Seo ............................. | 396/55 |
| 2005/0157287 A1 | | 7/2005 | Seo | |
| 2005/0190267 A1 | | 9/2005 | Uenaka et al. | |
| 2005/0276589 A1 | | 12/2005 | Seo | |
| 2006/0007320 A1 | | 1/2006 | Seo | |
| 2006/0017818 A1 | | 1/2006 | Enomoto | |

FOREIGN PATENT DOCUMENTS

| | | |
|---|---|---|
| JP | 8-152659 | 6/1996 |
| JP | 8-154196 | 6/1996 |
| JP | 8-304868 | 11/1996 |

OTHER PUBLICATIONS

English Language Abstract of JP 8-154196.
U.S. Appl. No. 11/255,946 to Seo, filed Oct. 24, 2005.

* cited by examiner

*Primary Examiner*—Christopher E Mahoney
*Assistant Examiner*—Autumn Parker
(74) *Attorney, Agent, or Firm*—Greenblum & Bernstein, P.L.C.

(57) ABSTRACT

A stage apparatus includes a stationary support plate; a Y-direction moving member including a Y-direction rod portion and an X-direction rod portion connected thereto parallel with the stationary support plate, the Y-direction moving member being supported by the stationary support plate so as to relatively move in the Y-direction; an X-direction moving member supported by the X-direction rod portion so as to relatively move in the X-direction. One of the X-direction moving member and the stationary support plate is provided with a projection, and the other of the X-direction moving member and the stationary support plate is provided with a rotation restriction support portion supporting the projection to move in a plane parallel with the stationary support plate relative to the other of the X-direction moving member and the stationary support plate and which prevents rotation of the X-direction moving member about the X-direction rod portion.

11 Claims, 16 Drawing Sheets

STAGE APPARATUS AND CAMERA SHAKE CORRECTING APPARATUS USING THE STAGE APPARATUS

BACKGROUND OF THE INVENTION

1. Field of the Invention

The present invention relates to a stage apparatus which linearly moves a member which holds, for example, a CCD in two orthogonal directions, and a camera shake correction apparatus using the stage apparatus.

2. Description of the Prior Art

A known stage apparatus, which linearly moves a stage plate in a plane along two orthogonal directions, is used for in camera shake correcting apparatus as disclosed in, for example, Japanese Unexamined Patent Publication Nos. H08-154196 and H08-152659.

In the above-mentioned known stage apparatuses, a lens barrel 710 (stationary support plate) is provided on one surface thereof with a Y-direction guide member projecting therefrom, which is in turn provided with a Y-direction hole linearly extending therethrough in a Y-direction. An arm of a support shaft 74 (Y-direction moving member) (which is formed by bending a rod member into an L-shape) is fitted into the Y-direction hole so as to relatively move in order to linearly guide the Y-direction moving member in the Y-direction. A projection provided on a support frame 72 (stage plate) (X-direction moving member) to which a correction lens is secured is provided with a hole 72 (X-direction hole) extending therethrough in an X-direction perpendicular to the Y-direction. The other arm of the Y-direction moving member is fitted in the X-direction hole so as to relatively move, so that the stage plate is linearly moved in the X-direction by the other arm of the Y-direction moving member. Moreover, the stage plate is supported at three points on the front and rear surfaces thereof by rigid balls which are pressed against the front and rear surfaces of the stage plate by the biasing force of spring washers 12 (biasing device), whereby the stage plate is always placed in an imaginary X-Y plane parallel with the X and Y directions.

When the linear drive force in the X-direction is applied to the stage plate by an actuator, the stage plate is linearly moved in the X-direction along the other arm of the Y-direction moving member in the imaginary X-Y plane. When the linear drive force in the Y-direction is applied to the stage plate by the actuator, the one arm of the Y-direction moving member is moved in the Y-direction along the Y-direction hole in the imaginary X-Y plate to thereby linearly move the stage plate together in the Y-direction.

When the actuator is driven in accordance with oscillation information detected by a shake detection sensor provided in the camera, the correction lens is moved in the X and Y directions to correct camera shake.

However, in the above-mentioned known stage apparatuses, the structure thereof is complicated due to rigid balls which support the front and rear surfaces of the stage plate at three points are necessary in addition to the stationary support plate, the Y-direction moving member and the stage plate.

Furthermore, since the rigid balls are pressed against the front and rear surfaces of the stage plate by the biasing force of the biasing device (spring washers), a large frictional force is produced between the rigid balls and the stage plate, and consequently, the response speed of the stage apparatus is reduced.

SUMMARY OF THE INVENTION

According to an aspect of the present invention, a stage apparatus is provided, including a stationary support plate; a Y-direction moving member including a Y-direction rod portion extending in a Y-direction, parallel with the stationary support plate, and an X-direction rod portion connected to the Y-direction rod portion and extending in a X-direction parallel with the stationary support plate and extending perpendicular to the Y-direction, the Y-direction moving member being supported by the stationary support plate so as to relatively move in the Y-direction; an X-direction moving member which is supported by the X-direction rod portion of the Y-direction moving member so as to relatively move in the X-direction. One of the X-direction moving member and the stationary support plate is provided with a projection, and the other of the X-direction moving member and the stationary support plate is provided with a rotation restriction support portion which supports the projection to move in a plane parallel with the stationary support plate relative to the other of the X-direction moving member and the stationary support plate and which prevents rotation of the X-direction moving member about the X-direction rod portion.

It is desirable for the rotation restriction support portion to include a guide rod extending parallel with the stationary support plate, the projection being provided with an elongated hole in which the guide rod is fitted so as to relatively move in the X-direction so that the X-direction moving member and the stationary support plate are relatively movable in the X-direction and the Y-direction.

It is desirable for the guide rod to include an X-direction guide rod extending in the X-direction, and the elongated hole includes a Y-direction elongated hole which is longer than a width of the X-direction guide rod in the Y-direction, wherein the X-direction guide rod is fitted in the Y-direction elongated hole so as to relatively move in the X-direction and the Y-direction.

It is desirable for the guide rod to include the Y-direction rod portion and the elongated hole includes an X-direction elongated hole which is longer than the Y-direction rod portion in the X-direction, wherein the Y-direction rod portion is fitted in the X-direction elongated hole to relatively move in the X-direction.

It is desirable for the rotation restriction support portion to include a leaf spring and a guide member, which extend parallel with the stationary support plate, wherein one surface of the projection is in sliding contact with the leaf spring and the other surface of the projection is in sliding contact the guide member, so that the projection is provided in between the leaf spring and the guide member so as to be relatively movable in the X-direction and the Y-direction.

It is desirable for the projection to be provided on front and rear surfaces thereof with sliding members, wherein one of the sliding members is in sliding contact with one of the leaf spring and the front surface of the projection, and the other of the sliding members is in sliding contact with one of the guide member and the rear surface of the projection.

It is desirable for the stationary support plate to include a Y-direction guide hole in which the Y-direction rod portion of the Y-direction moving member is guided to slide in the Y-direction, and a Y-direction elongated hole which supports a free end of the X-direction rod portion of the Y-direction moving member so as to relatively move in the Y-direction and which prevents rotation of the X-direction rod portion about the Y-direction rod portion.

It is desirable for the X-direction moving member to include an X-direction guide hole via which the X-direction rod portion Is fitted so that the X-direction moving member is supported thereby to linearly move in the X-direction.

It is desirable for the stage apparatus to include a Y-direction actuator for driving the Y-direction moving member in the Y-direction, and an X-direction actuator for driving the X-direction moving member in the X-direction.

It is desirable for the camera shake correcting apparatus to include a camera in which the stage apparatus is incorporated; an image pickup device secured to a front surface of the X-direction moving member and having an image pickup surface located at an imaging plane of an optical system of the camera; a shake detection sensor for detecting camera shake of the camera; and a control device for driving the X-direction actuator and the Y-direction actuator to correct the camera shake detected by the shake detection sensor.

It is desirable for the camera shake correcting apparatus to include a camera in which the stage apparatus is incorporated; a correction lens positioned perpendicularly to an optical axis of an optical system of the camera and secured to the X-direction moving member in front of an image forming surface for correcting camera shake; a shake detection sensor for detecting the camera shake; and a control device for driving the X-direction actuator and the Y-direction actuator to correct the camera shake detected by the shake detection sensor.

According to the present invention, a simple and highly sensitive stage apparatus and a camera shake correcting apparatus can be obtained.

The present disclosure relates to subject matter contained in Japanese Patent Application No. 2005-000327 (filed on Jan. 5, 2005) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

A first embodiment of the present invention will be discussed below with reference to FIGS. 1 through 14.

Figure 1:
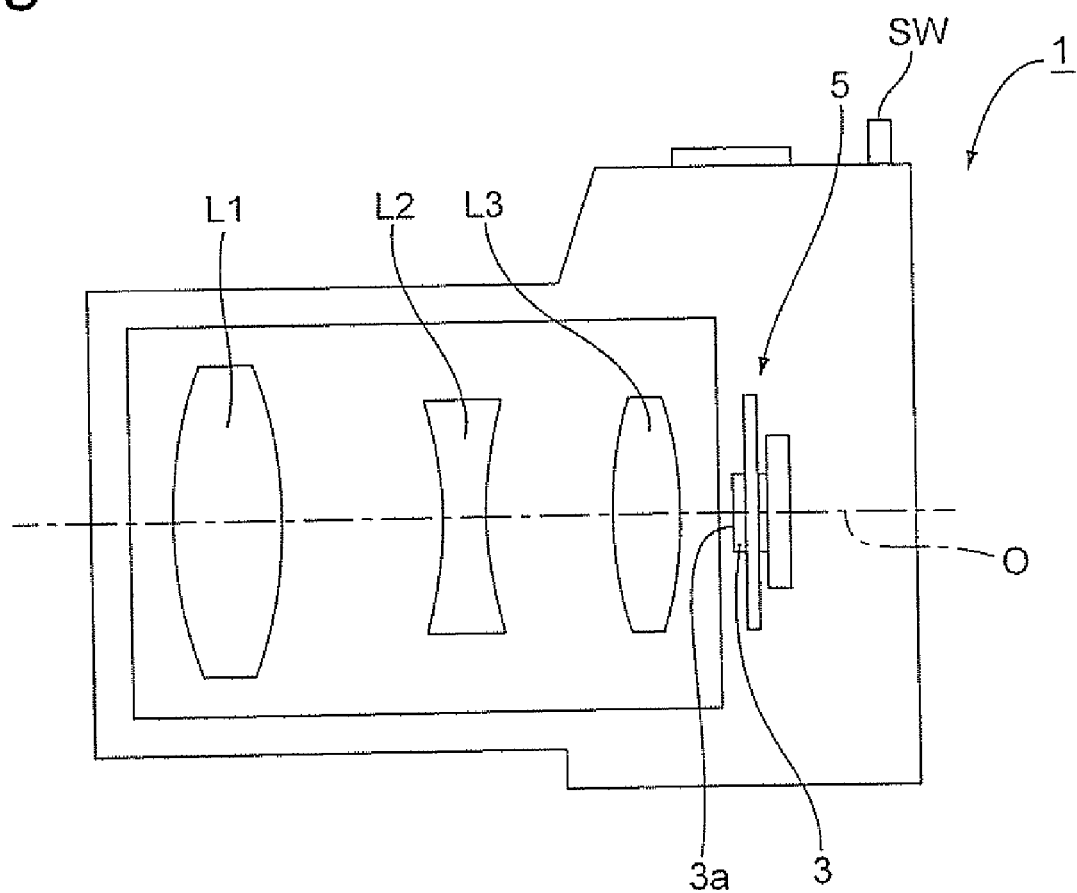
FIG. 1 is a longitudinal sectional view of a digital camera having a camera shake correcting apparatus incorporated therein, according to a first embodiment of the present invention.

As shown in FIG. 1, the digital camera 1 has an optical system (camera optical system) including a plurality of lenses L1, L2, and L3. A CCD (image pickup device) 3 is provided behind the lens L3. The CCD 3 has an image pickup surface (image forming surface) 3a which is perpendicular to the optical axis O of the camera optical system. The image pickup surface 3a of the CCD is coincident with the image forming position of the camera optical system and is secured to a camera shake correcting apparatus 5 incorporated in the digital camera 1.

The camera shake correcting apparatus 5 is constructed as shown in FIGS. 2 through 14.

Figure 2:
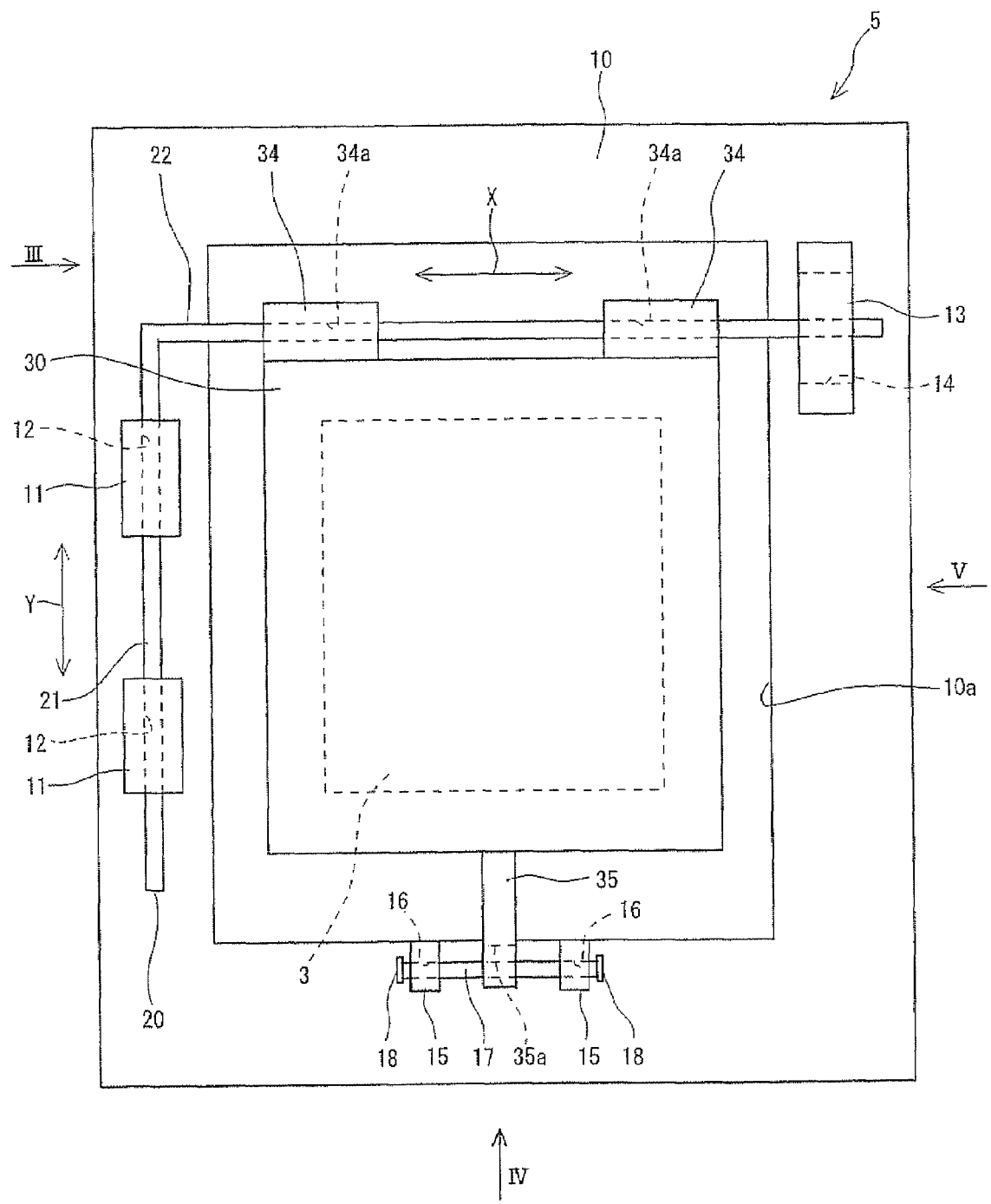
FIG. 2 is a rear view of a camera shake correcting apparatus in an inoperative position, in which an electric circuit board and yokes are omitted.
Figure 3:
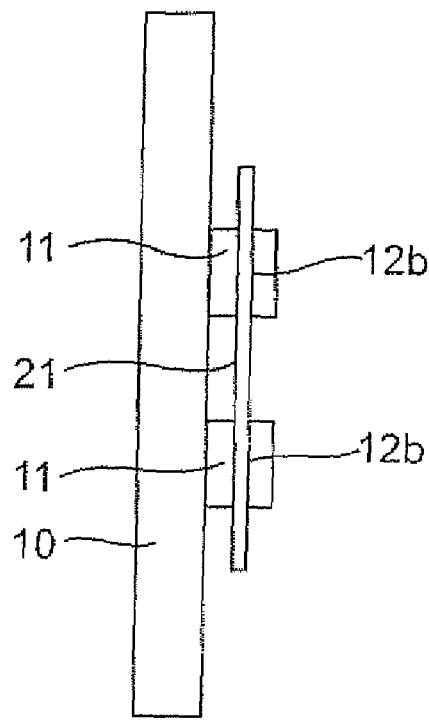
FIG. 3 is a side view of a camera shake correcting apparatus, viewed from the direction III in FIG. 2, in which a base plate and a cover member, etc., are omitted.
Figure 6:
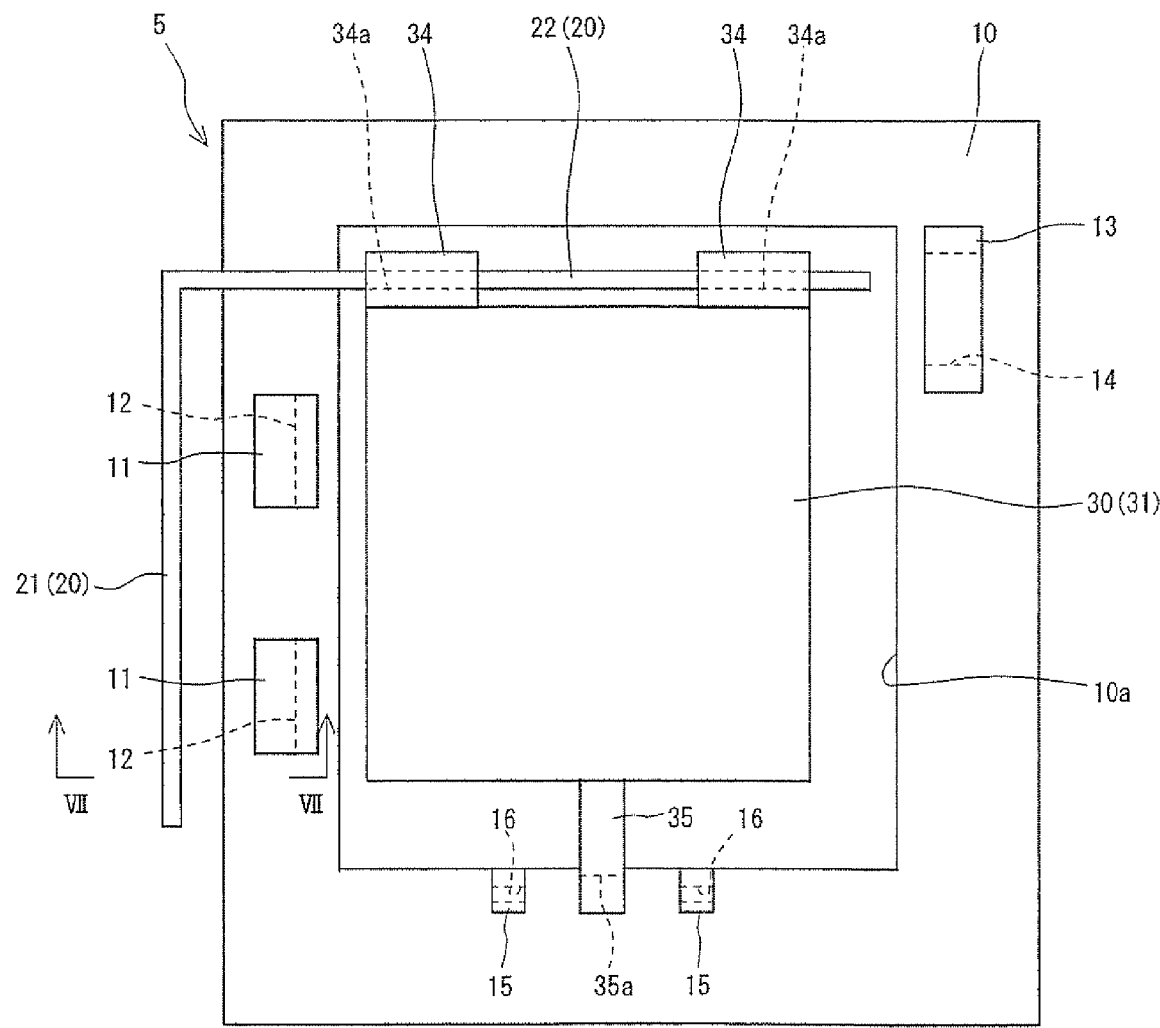
FIG. 6 is a rear view of an assembled camera shake correcting apparatus, in which a CCD, an electric circuit board and yokes, etc., are omitted.
Figure 7:
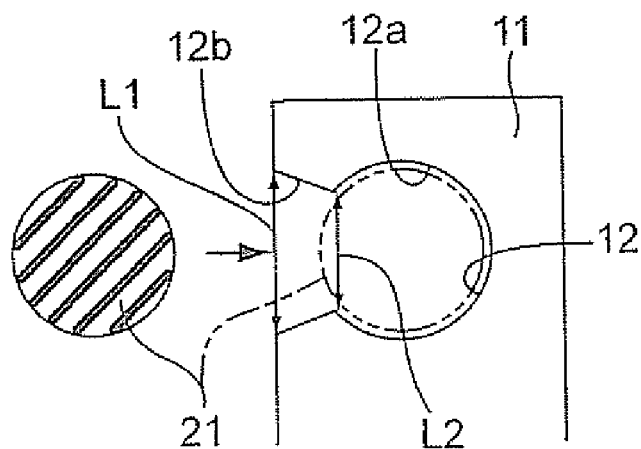
FIG. 7 is a sectional view of a Y-direction rod portion and a Y-direction guide portion having a guide portion in which the Y-direction rod portion can be fitted, taken along the line VII-VII in FIG. 6.
Figure 8:
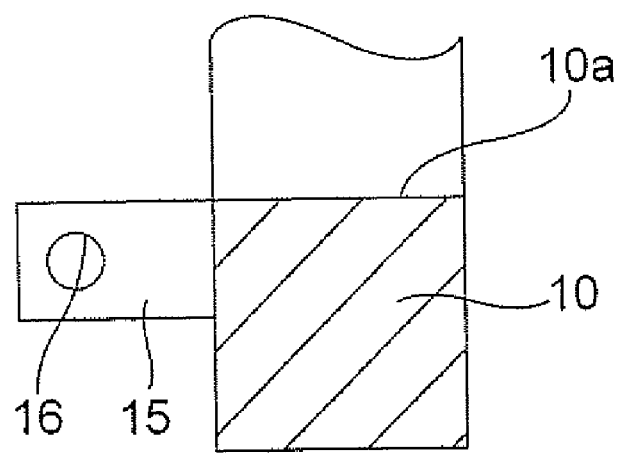
FIG. 8 is an enlarged side view of a support hole of a support portion.
Figure 9:
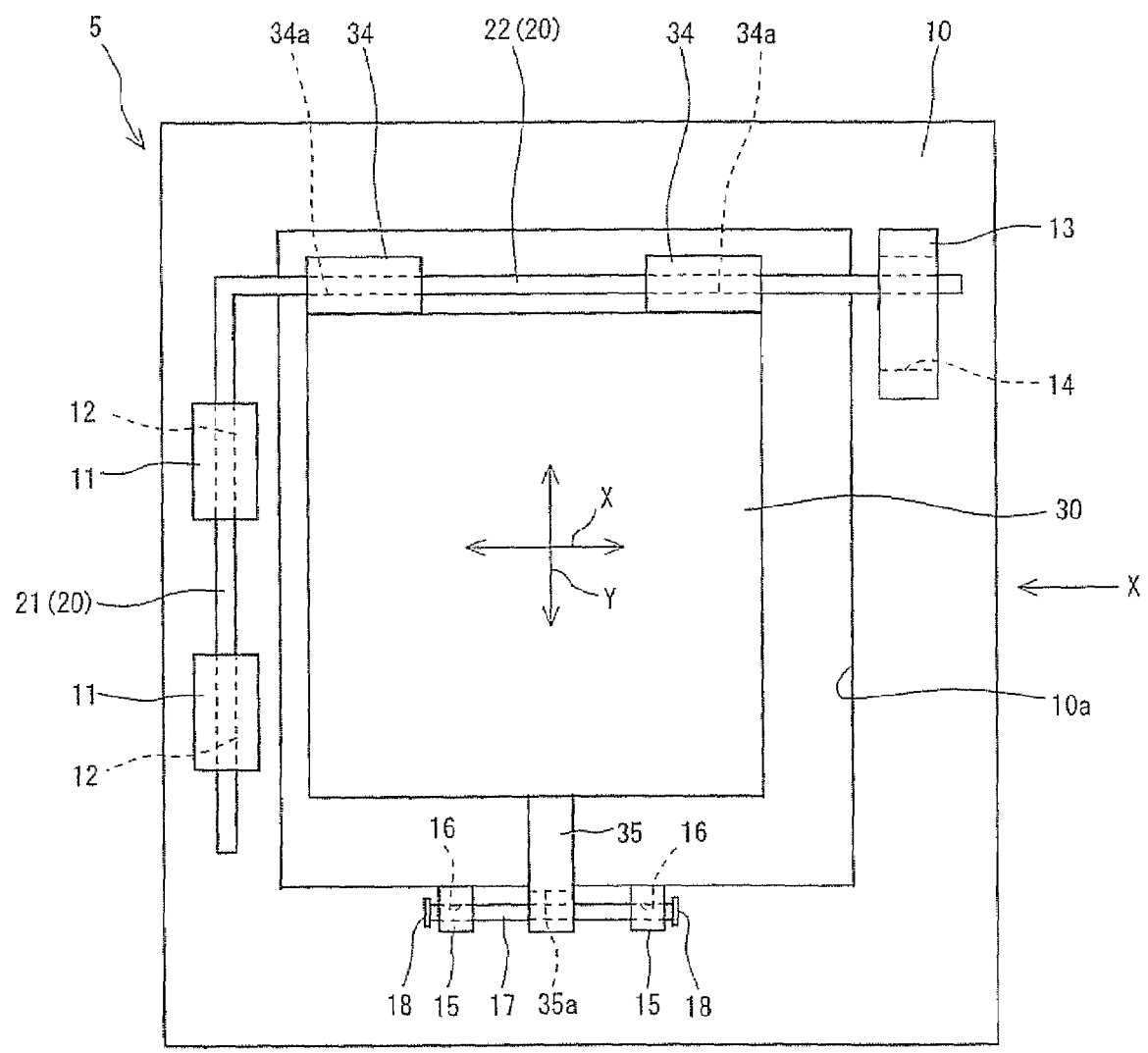
FIG. 9 is a rear view of a camera shake correcting apparatus in an operative position, in which a CCD, a circuit board and yokes, etc., are omitted.
Figure 10:
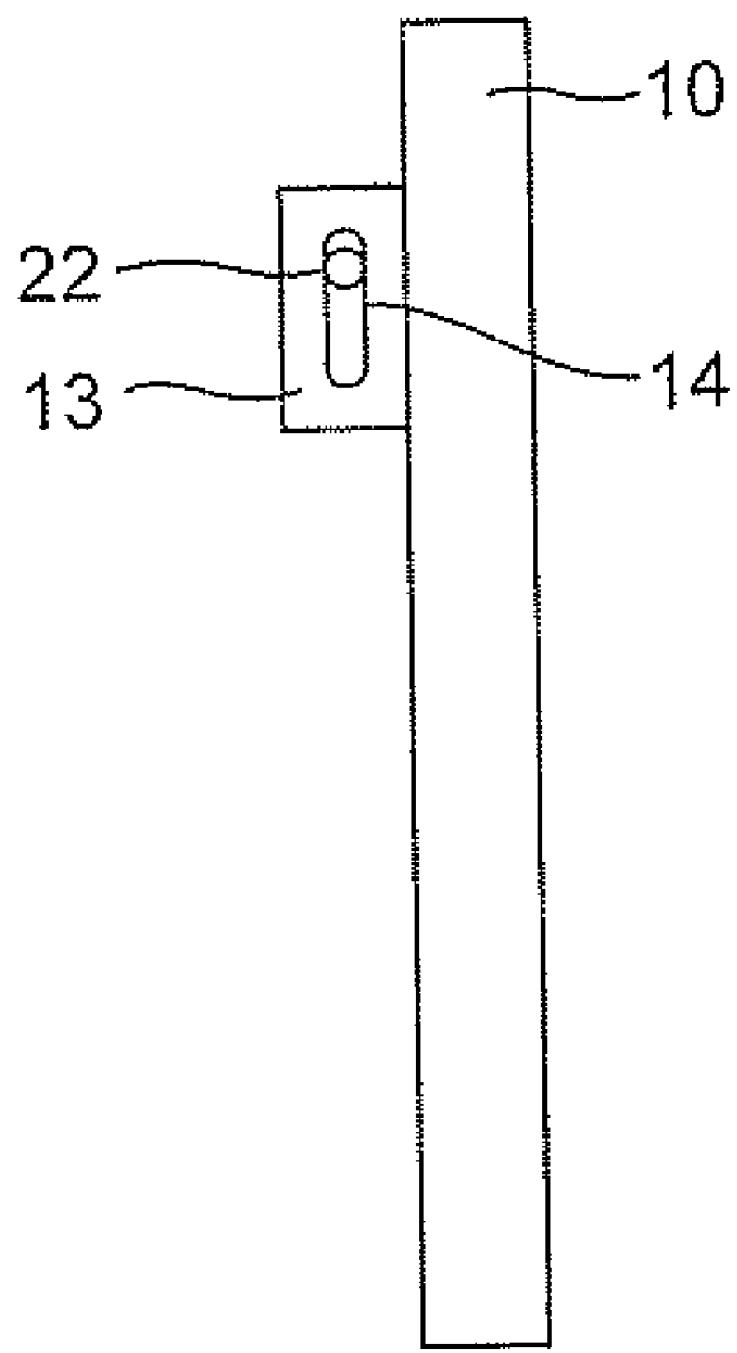
FIG. 10 is a side view of a camera shake correcting apparatus viewed from the X-direction in FIG. 9, in which a base plate and a cover member, etc., are omitted.

As shown in FIGS. 2, 6 and 9, the stationary support plate 10, which is square in shape as viewed from the back thereof and is provided at its center portion with a square receiving hole 10a, is secured to the camera body of the digital camera 1 by a securing device (not shown), so that the support plate 10 is perpendicular to the optical axis O and the optical axis O is located at the center of the receiving hole 10a. The stationary support plate 10 is provided, on the left side of the rear surface thereof, with two identical Y-direction guide portions 11 made of an elastic material, such as synthetic resin and aligned in the Y-direction indicated by arrows Y (upward and downward direction, parallel with the stationary support plate 10). Y-direction guide grooves 12 extend linearly through the Y-direction guide portions 11 in the Y-direction. As shown in FIG. 7, the Y-direction guide grooves 12 each have a guide portion (Y-direction guide hole) 12a having a circular cross section and an opening portion 12b which communicatively connects the guide portion 12a with the outside of the Y-direction guide portions 11. The guide portions 12a provided in the upper and lower Y-direction guide portions 11 are coaxial with each other. The outer most width L1 of the opening portions 12b is larger than the opening width L2 of the connecting portions thereof to the guide portions 12a.

The stationary support plate 10 is also provided, on the right side of the rear surface thereof, with a free end support portion 13 which is provided with a Y-direction elongated hole 14 extending therethrough in an X-direction (lateral direction perpendicular to the Y-direction) and being longer in the Y-direction than the X-direction. The center axis of the Y-direction elongated hole 14 in the X-direction and the center axis of the guide portions 12a are located in a common X-Y plane, parallel with the X and Y directions.

Moreover, the stationary support plate 10 is provided, on the lower end of the rear surface thereof, with a pair of right and left support portions 15 extending rearward, which are provided with support holes 16 extending therethrough in the X-direction and are coaxial to each other. An X-direction guide rod (rotation restriction support portion) 17 extending in the X-direction and having a circular cross section is able to be fitted in and secured to the support holes 16.

As can be seen in FIGS. 2, 6 and 9, the Y-direction moving member 20 is formed by bending a metal rod, having a circular cross section, into an L-shape as viewed from back and includes a Y-direction rod portion 21 extending in the Y-direction and an X-direction rod portion 22 extending from the upper end of the Y-direction rod portion 21 in the X-direction (lateral direction in FIGS. 2, 6 and 9) perpendicular to the Y-direction. The outer diameter of the Y-direction rod portion 21 and the inner diameter of the guide portions 12a are substantially the same. The diameter of the section of the X-direction rod portion 22 is substantially the same as the width of the Y-direction elongated hole 14 in the forward/rearward direction and is smaller than the length of the Y-direction elongated hole in the Y-direction.

Figure 12:
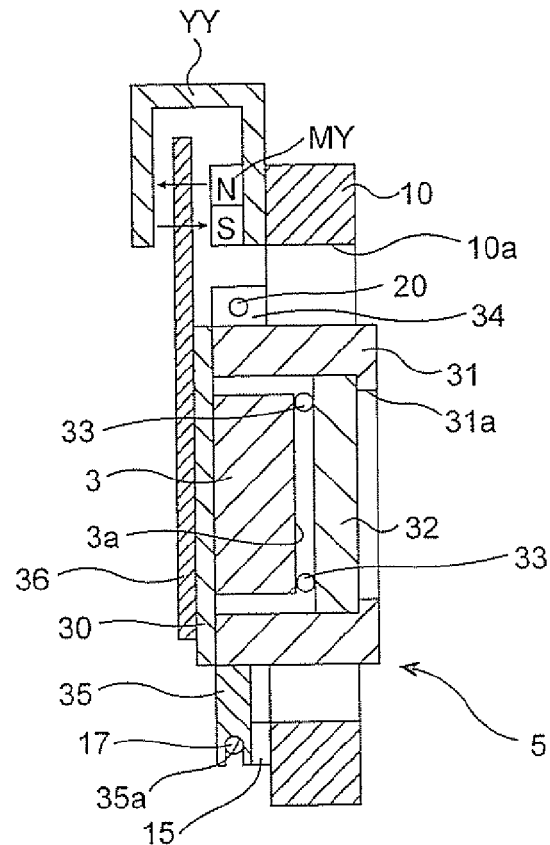
FIG. 12 is a sectional view taken along the line XII-XII in FIG. 11.

The CCD 3 is secured to the front surface of a base plate (an element of an X-direction movable member) 30 which is square in shape as viewed from the back thereof. As shown in FIG. 12, a hollow cover member (an element of the X-direction moving member) 31 is secured at the rear surface thereof to the front surface of the base plate 30 to surround the CCD 3. The cover member 31 is provided in the front surface thereof with a light receiving hole 31a which is square in shape. The image pickup surface 3a of the CCD 3 is entirely exposed through the light receiving hole 31a as viewed from the front side thereof. Furthermore, a low-pass filter 32 made of a transparent material is provided in the internal space of the cover member 31 and is in contact with the inner peripheral surface of the front portion of the cover member 31. An annular square retainer member 33, which is in contact with the peripheral edge of the image pickup surface 3a, is provided between the periphery of the image pickup surface 3a of the CCD 3 and the low-pass filter 32.

A pair of right and left X-direction guide portions (X-direction moving members) 34 are provided on the upper surface of the cover member 31. The cover member 31 is provided on its lower surface with a downwardly extending projection (X-direction moving member) 35 (see FIG. 12). The projection 35 is provided on its lower end with a Y-direction elongated groove (hole) 35a which extends therethrough in the X-direction, has an open lower end, and is longer in the Y-direction than the X-direction. The Y-direction elongated groove 35a is substantially the same size as the diameter of the X-direction guide rod 17 in the forward/rearward direction and has a length larger than the diameter of the X-direction guide rod 17 in the upward and downward direction (Y-direction). The center axes of the right and left X-direction guide holes 34a and the center axis of the Y-direction elongated groove 35a are located in a plane parallel with the X-direction and the Y-direction.

Figure 11:
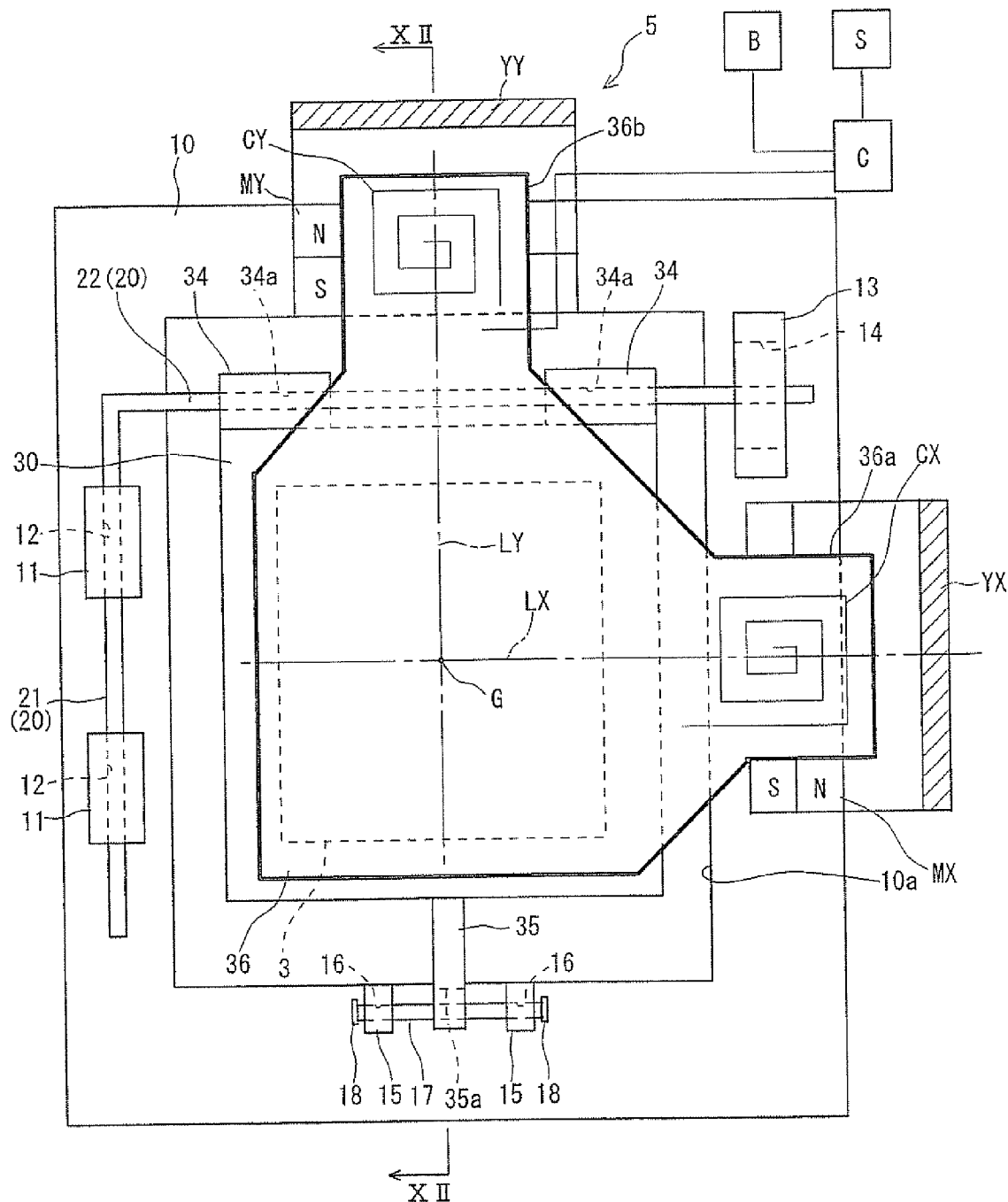
FIG. 11 is a rear view of a camera shake correcting apparatus in an inoperative position in which the yokes are sectioned.

As shown in FIGS. 11 and 12, the base plate 30 is provided on its rear surface with an electric circuit board 36 which is provided with a large number of electric conductors (not shown) to which the CCD 3 is electrically connected. The circuit board 36 is provided with two projecting tongues 36a and 36b which are provided on rear surfaces thereof with a printed X-direction drive coil (drive coil) CX and a printed Y-direction drive coil (drive coil) CY, respectively.

Figure 13:
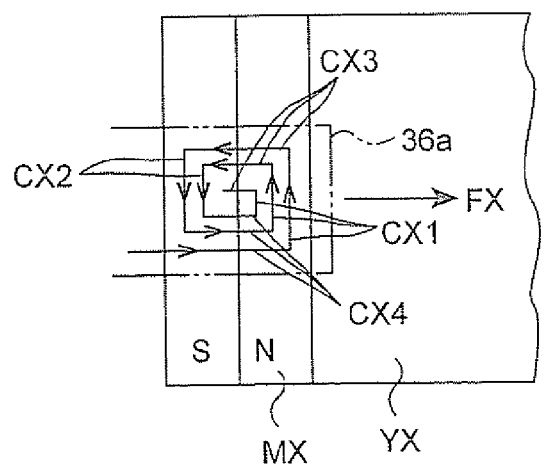
FIG. 13 is an enlarged schematic view of an X-direction actuator.
Figure 14:
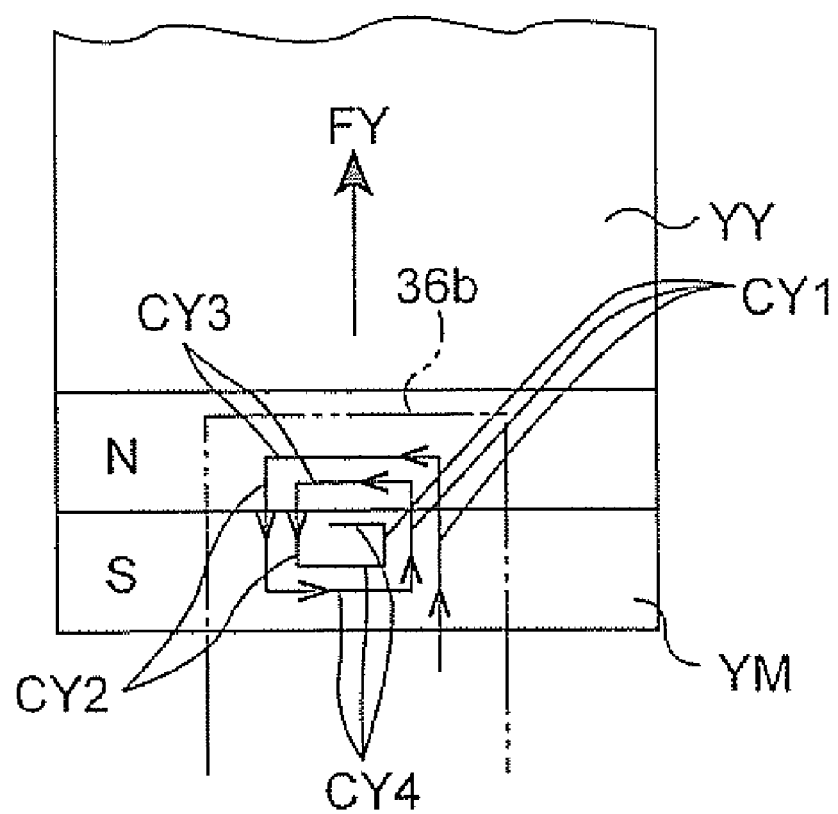
FIG. 14 is an enlarged schematic view of a Y-direction actuator.

As shown in FIG. 13, the X-direction drive coil CX is rectangularly coiled and is defined by linear right sides CX1, linear left sides CX2, linear upper sides CX3, and linear lower sides CX4. As shown in FIG. 14, the Y-direction drive coil CY is rectangularly coiled and defined by linear right sides CY1, linear left sides CY2, linear upper sides CY3, and linear lower sides CY4. The X-direction drive coil CX and the Y-direction drive coil CY are shown with only several turns of electric wires for clarity, however, in practice, the X-direction drive coil CX and the Y-direction drive coil CY each have a few dozen turns.

The X-direction drive coil CX and the Y-direction drive coil CY are connected at their opposite ends to the electric conductors (leads) of the circuit board 36. Furthermore, as shown in FIG. 11, an imaginary X-direction straight line LX, which linearly extends in the X-direction and passes through the center of the X-direction drive coil CX, passes through the center of gravity G of an X-direction moving unit including the circuit board 36, the base plate 30, the cover member 31 (X-direction guide portion 34, the projection 35) the low-pass filter 32, the retainer member 33 and the CCD 3, as viewed from the rear of the camera shake correction apparatus 5. Likewise, an imaginary Y-direction straight line LY, which linearly extends in the Y-direction and passes through the center of the Y-direction drive coil CY, substantially passes through the center of gravity (slightly deviated from the center of gravity G) of a Y-direction moving unit including the X-direction moving unit and the Y-direction moving member 20, in an inoperative position shown in FIG. 11.

Yokes YX and YY which are generally U-shaped in cross section, made of magnetic material such as a metal, are secured to the rear surface of the stationary support plate 10. The yokes YX and YY are provided on the rear surfaces of their front portions with magnets MX and MY, respectively. The N-pole and S-pole of the magnet MX of the yoke YX are arranged in the n-direction and the N-pole and S-pole of the magnet MY of the yoke YY are arranged in the Y-direction.

The rear end of the yoke YY is opposed to the magnet MY to form a magnetic circuit therebetween, as shown in FIG. 12. Likewise, though not shown in the drawings, the rear end of the yoke YX and the magnet MX forms a magnetic circuit.

The camera shake correcting apparatus 5 is assembled as follows.

The cover member 31 is located in the receiving opening 10a, as shown in FIG. 6, and the projections 36a and 36b are located in the yokes YX and YY (not shown in FIG. 6). In this state, the Y-direction moving member 20 is moved close to the cover member 31 from the left side in FIG. 6 and the X-direction rod portion 22 of the Y-direction moving member 20 is inserted through the X-direction guide holes 34a of the X-direction guide portions 34 of the cover member 31 so as to slide only in the X-direction. Accordingly, the circuit board 36 (cover member 31) is relatively movable with respect to the Y-direction moving member 20 in the X-direction.

Thereafter, as shown in FIG. 6, the Y-direction moving member 20, which has been fitted through the X-direction guide portions 34, is further linearly moved in the right direction from the left side in FIG. 6, so that the free end of the X-direction rod portion 22 is fitted into the Y-direction elongated hole 14 of the free end support portion 13 and the Y-direction rod portion 21 is fitted in the opening portions 12b of the Y-direction guide portions 11. When the Y-direction rod portion 21 is fitted in the opening portions 12b, the opening portions 12b are resiliently deformed to be expanded because the diameter of the Y-direction rod portion 21 is smaller than the outermost opening width L1 of the opening portion 12b but larger than the innermost opening width L2 thereof. Further movement of the Y-direction rod portion 21 in the right direction in FIG. 6 causes the Y-direction rod portion 21 to be firmly engaged in the guide portions 12a of the pair of Y-direction guide grooves 12 while the opening portions 12b of the pair of Y-direction guide portions 11 resiliently return to their original shapes.

When the X-direction guide rod 17 is inserted in the right and left support holes 16 and the Y-direction elongated groove 35a positioned therebetween, the X-direction guide rod 17 is fitted in the support holes 16 so as not to move, and the Y-direction elongated groove 35a (projection 35) is relatively slidable with respect to the X-direction guide rod 17 in the X-direction and the Y-direction. When the circular retainers 18 whose diameter is larger than the support holes 16 are secured to the opposite ends of the X-direction guide rod 17, the assembly of the camera shake correcting apparatus 5 is completed as shown in FIGS. 11 and 12.

Note that the Y-direction moving member 20 can be easily removed from the Y-direction guide grooves 12 and the Y-direction elongated hole 14 by linearly moving the Y-direction moving member in the left direction with respect to FIG. 6 with a force necessary to elastically deform the opening portions 12b.

Figure 4:
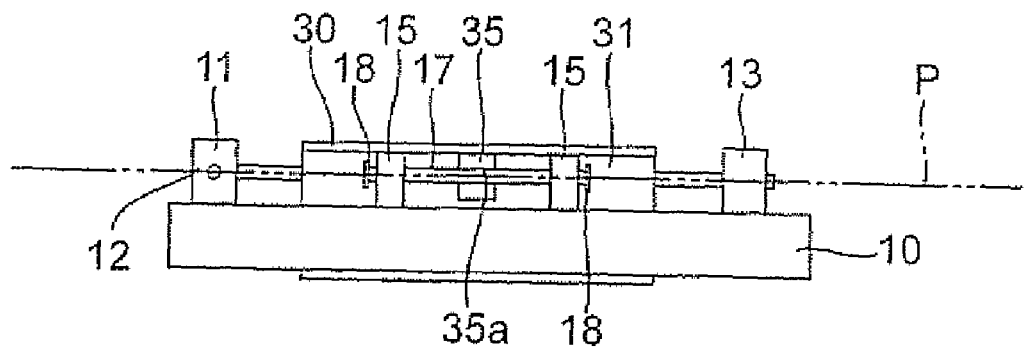
FIG. 4 is a bottom view of a camera shake correcting apparatus, viewed from the direction IV in FIG. 2.
Figure 5:
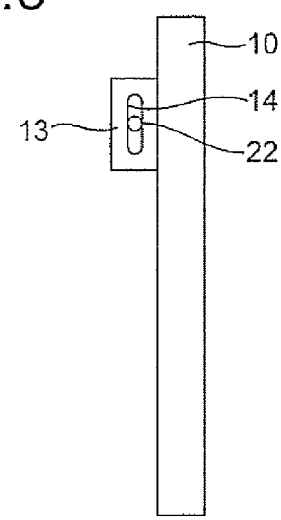
FIG. 5 is a side view of a camera shake correcting apparatus viewed from the direction V in FIG. 2, in which a base plate and a cover member, etc., are omitted.

As mentioned above, since the diameter of the X-direction rod portion 22 and the width of the Y-direction elongated hole 14 in the forward/rearward direction are substantially the same, rotation of the Y-direction moving member 20 about the Y-direction rod portion 21 is prevented. Moreover, since the diameter of the X-direction guide rod 17 and the width of the Y-direction elongated groove 35a in the forward/rearward direction are substantially the same, rotation of the cover member 31 (base plate 30) about the X-direction rod portion 22 is prevented. Consequently, the center axes of the Y-direction rod portion 21 and the X-direction rod portion 22 are always located in an imaginary X-Y plane P (FIG. 4) parallel with the X-direction and the Y-direction. Moreover, as shown in FIG. 4, the Y-direction guide portions 11, the free end support portion 13, the cover member 31, the X-direction guide rod 17, the projection 35, and the support 15 are located in the imaginary X-Y pane P.

As shown in FIG. 11, the digital camera 1 includes therein a battery B, a shake detection sensor S for detecting the oscillation of the digital camera 1, and a control circuit (control device) C which controls the direction of the current and the magnitude of the power produced by the battery B, to be supplied to the coils CX and CY, in accordance with the oscillation information detected by the shake detection sensor S. The battery B and the shake detection sensor S are electrically connected to the controller C which is in turn electrically connected to the electric conductors of the circuit board 36.

The components of the camera shake correcting apparatus 5, other than the battery B, the shake detection sensor S and the controller C, constitute a stage apparatus of the present invention.

Moreover, the magnet MX and the yoke YX form an X-direction magnetic-force generator and the magnet MY and the yoke YY form a Y-direction magnetic-force generator. The X-direction magnetic-force generator and the X-direction drive coil CX constitute a X-direction actuator, and the Y-direction magnetic-force generator and the Y-direction drive coil CY constitute a Y-direction actuator.

The camera shake correcting apparatus 5 operates as follows.

When the digital camera 1 carries out a photographing operation, the object light transmitted through the lenses L1 through L3 is converged onto the image pickup surface 3a of the CCD 3 through the receiving opening 10a and the low-pass filter 32. Upon photographing, when a camera shake correcting switch SW (see FIG. 1) of the digital camera 1 is turned ON, the shake detection sensor S does not detect the oscillation unless camera shake (image movement) occurs. Accordingly, the camera shake correcting apparatus 5 maintains the inoperative position shown in FIGS. 2 through 5 and FIG. 11 if no camera shake occurs. If camera shake of the digital camera 1 occurs, the camera shake (vibration, etc.) of the digital camera 1 is detected by the shake detection sensor S, and a detection signal is transmitted to the control circuit C. Consequently, the control circuit C permits current to be supplied from the battery B to the X-direction drive coil CX and the Y-direction drive coil CY while controlling the magnitude and the direction of the current.

The cover member 31 (circuit board 36) is movable in the X-direction within the range in which the linear right sides CX1 of the X-direction drive coil CX maintain an overlapped relationship with the N-pole of the magnet MX and the linear left sides CX2 thereof maintain an overlapped relationship with the S-pole of the magnet MX in the forward/rearward direction.

In the inoperative position shown in FIG. 13, for example, if the current in the direction indicated by arrows in FIG. 13 is supplied to the X-direction drive coil CX, the linear force FX in the X-direction and in the right direction is generated in the linear right sides CX1 and the linear left sides CX2. Due to the force FX, the X-direction guide portion 34 and the projection 35 are moved in the right direction along the X-direction rod portion 22 and the X-direction guide rod 17. Consequently, the cover member 31 (CCD 3) is moved right relative to the stationary support plate 10. Note that forces are generated in the linear upper sides CX3 and the linear lower sides CX4 in directions perpendicular to the direction of the force FX (i.e., are generated in the Y-direction), however, these forces cancel each other out, and hence, no force acts on the circuit board 36.

If the current in the direction opposite to the direction indicated by the arrows in FIG. 13 is supplied to the X-direction drive coil CX, the linear forces in the left direction and in the X-direction are generated in the linear right sides CX1 and the linear left sides CX2, so that the cover member 31 (CCD 3) is relatively moved in the left direction with respect to the stationary support plate 1 along the X-direction rod portion 22 and the X-direction guide rod 17.

The control circuit C controls the direction of the current to be supplied to the X-direction drive coil CX from the battery B as mentioned above, so that the linear right sides CX1 overlap the N-pole and the linear left sides CX2 overlap the S-pole, the Y-direction elongated groove 35a and the X-direction guide rod 17 maintain a fitting relationship, and the cover member 31 is moved in the X-direction (lateral direction) along the X-direction rod portion 22 and the X-direction guide rod 17 within the range in which the cover member 31 does not contact the receiving opening 10a.

Furthermore, as soon as the current supply to the X-direction drive coil CX from the battery B is stopped, the power in the X-direction is no longer generated, so that the cover member 31 (CCD 3) is stopped.

Since the magnitude of the current supplied to the X-direction drive coil CX and the force generated thereby are proportional to each other, if the current supplied to the X-direction drive coil CX from the battery B is increased, the force generated thereby is increased and vice versa.

The cover member 31 (CCD 3) is movable within a range so that the linear upper sides CY3 of the Y-direction drive coil CY overlap the N-pole of the magnet MY and the linear lower sides CY4 thereof overlap the S-pole of the magnet MY in the forward and downward direction.

In the inoperative position shown in FIG. 2, for example, if the current in the direction indicated by arrows in FIG. 14 is supplied to the Y-direction drive coil CY, the linear force FY in the Y-direction and in the upward direction is generated in the linear upper sides CY3 and the linear lower sides CY4. Due to the force FY, the Y-direction moving member 20 is moved in the upward direction with respect to the stationary support plate 10 along the Y-direction guide grooves 12 and the Y-direction elongated hole 14, and the Y-direction elongated groove 35a (projection 35) is relatively moved in the upward direction with respect to the X-direction guide rod 17. Consequently, the cover member 31 (CCD 3) is relatively moved upward. Note that forces are generated in the linear right sides CY1 and the linear left sides CY2 in directions perpendicular to the direction of the force FY (i.e., are generated in the X-direction), however, these forces cancel each other out, and hence, no force is applied to the circuit board 36.

If the current in the direction opposite to the direction indicated by the arrows in FIG. 14 is supplied to the Y-direction drive coil CY, the linear forces in the downward direction and in the Y-direction are generated in the linear upper sides CY3 and the linear lower sides CY4, so that the cover member 31 (CCD 3) is relatively moved in the downward direction with respect to the stationary support plate 10 along the Y-direction guide grooves 12 and the Y-direction elongated hole 14, and the Y-direction elongated groove 35a (projection 35) is moved downward relative to the X-direction guide rod 17.

The control circuit C controls the direction of the current to be supplied to the Y-direction drive coil CY as mentioned above, so that the linear upper sides CY3 overlap the N-pole and the linear lower sides CY4 overlap the S-pole and the cover member 31 (CCD 3) is moved in the Y-direction (upward and downward direction) along the Y-direction guide grooves 12 and the Y-direction elongated hole 14 within the range in which the cover member 31 does not contact the receiving opening 10a.

Furthermore, as soon as the current supply to the Y-direction drive coil CY from the battery B is stopped, the power in the Y-direction is no longer generated, so that the movement of the cover member 31 (CCD 3) is stopped.

Since the magnitude of the current supplied to the Y-direction drive coil CY and the force generated thereby are proportional to each other, if the current to be supplied to the Y-direction drive coil CY from the battery B is increased, the force generated thereby is increased and vice versa.

As can be understood from the above description, the position of the CCD 3 secured to the base plate 30 in the directions X and Y is changed by the movement of the cover member 31 (circuit board 36) in the directions X and Y to carry out the camera shake correcting operation.

In the first embodiment, since the X-direction moving member (cover member 31, the X-direction guide portion 34, the projection 35) is maintained to be parallel with the stationary support plate 10 by the X-direction guide rod 17 and the Y-direction elongated groove 35a formed in the projection 35 instead of providing rigid balls and a biasing device, as in the prior art, the number of the components can be reduced and the structure is simplified in comparison with the prior art.

Moreover, since no biasing force in a direction parallel with the optical axis O is applied to the X-direction moving member, unlike the prior art, no increase in the sliding resistance between the X-direction rod portion 22 and the X-direction guide holes 34a occurs, no increase in the sliding resistance between the Y-direction elongated groove 35a and the X-direction guide rod 17 occurs, no increase in the sliding resistance between the Y-direction guide rod portion 21 and the Y-direction guide hole 12 occurs, and no increase in the sliding resistance between the X-direction rod portion 22 and the Y-direction guide elongated hole 14 occurs. As a result, a smooth movement of the X-direction moving member relative to the Y-direction moving member 20 and a smooth movement of the Y-direction moving member 20 relative to the stationary support plate are achieved, thus resulting in the enhanced operability of the camera shake correcting apparatus 5

Furthermore, since the imaginary X-direction straight line LX passes through (intersects with) the center of gravity G of the X-direction moving body including the circuit board 36, the base plate 30, the cover member 31 (X-direction guide portion 34 and the projection 35), the low-pass filter 32, the retainer member 33, and the CCD 3, in the forward/rearward direction, the force generated in the X-direction drive coil CX can be effectively transmitted to the circuit board 36. On the other hand, since the imaginary Y-direction straight line LY passes through (intersects with) the center of gravity of the Y-direction moving unit including the X-direction moving unit and the Y-direction moving member 20, in the forward/rearward direction, and since this intersection relationship which is attained in a non-movement state is substantially maintained even after a slight movement of the center of gravity in the X-direction is caused by the movement of the circuit board 36 in the X-direction, the force generated in the Y-direction drive coil CY can be effectively transmitted to the circuit board 36.

Figure 15:
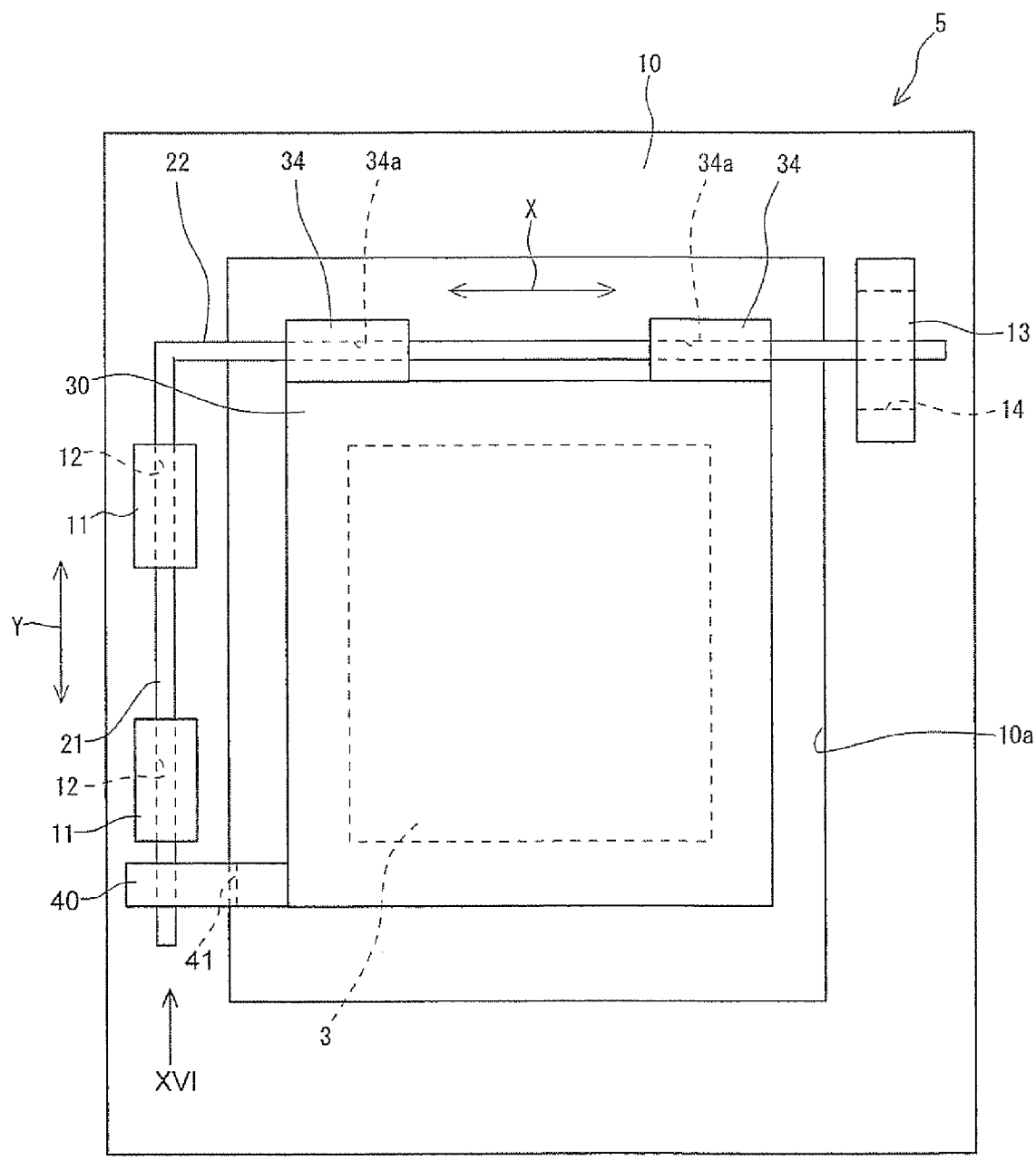
FIG. 15 is a rear view of a camera shake correcting apparatus in an inoperative position in which a circuit board and yokes are omitted, according to a second embodiment of the present invention.
Figure 16:
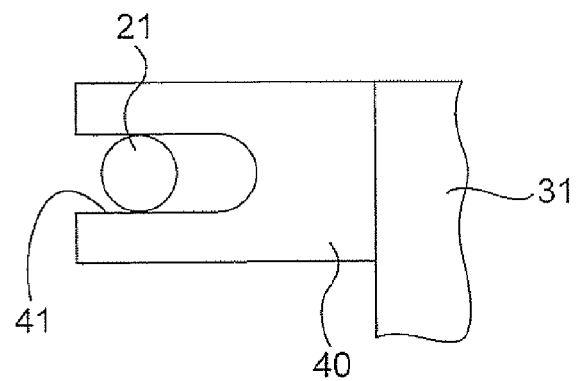
FIG. 16 is an enlarged view of a guide projection and a Y-direction rod portion, viewed from the direction XVI in FIG. 15.

A second embodiment of the present invention will be discussed below with reference to FIGS. 15 and 16. In the second embodiment, the components corresponding to those in the first embodiment are designated with like reference numerals and no duplicate explanation therefor will be given hereinafter.

In the second embodiment, the support portion 15, the X-direction guide rod 17, the circular retainer member 18 and the projection 35 are omitted. The cover member 31 is provided, on the lower end of the left side thereof, with a guide projection 40 extending in the left direction as viewed in FIG. 15. The guide projection 40 is provided with an X-direction elongated hole 41 having an open left end and extending therethrough in the Y-direction. The X-direction elongated hole 41 is longer in the X-direction than in the Y-direction. The Y-direction rod portion (rotation restricting support/guide rod) 21 extends through the X-direction elongated hole 41 in the Y-direction. As shown in FIG. 16, the width of the X-direction elongated hole 41 in the forward/rearward direction is substantially the same as the diameter of the Y-direction rod portion 21 and the length of the X-direction elongated hole 41 in the X-direction is larger than the diameter of the Y-direction rod portion 21. The Y-direction rod portion 21 and the guide projection 40 are relatively movable in the X and Y directions.

In the second embodiment, the cover member 31 (CCD 3) is relatively movable with respect to the Y-direction moving member 20 in the X-direction, within the range wherein the Y-direction rod portion 21 is fitted in the X-direction elongated hole 41. Since the X-direction moving member (the cover member 31, the X-direction guide portion 34, the guide projection 40) is always maintained parallel with the stationary support plate 10 via the Y-direction rod portion 21 and the guide projection 40, the number of components of the stage apparatus is less and the structure is simpler than those in the prior art.

Moreover, unlike the prior art, since no biasing force in a direction parallel with the optical axis O is applied to the X-direction moving member, no increase in the sliding resistance between the X-direction elongated hole 41 and the Y-direction rod portion 21 occurs. Thus, the X-direction moving member is moved smoothly with respect to the Y-direction moving member 20, and hence, the operability of the camera shake correcting apparatus 5 can be enhanced, as in the first embodiment.

Although the above discussion has been applied to the first and second embodiments, the present invention is not limited thereto and can be modified in various ways.

Figure 17:
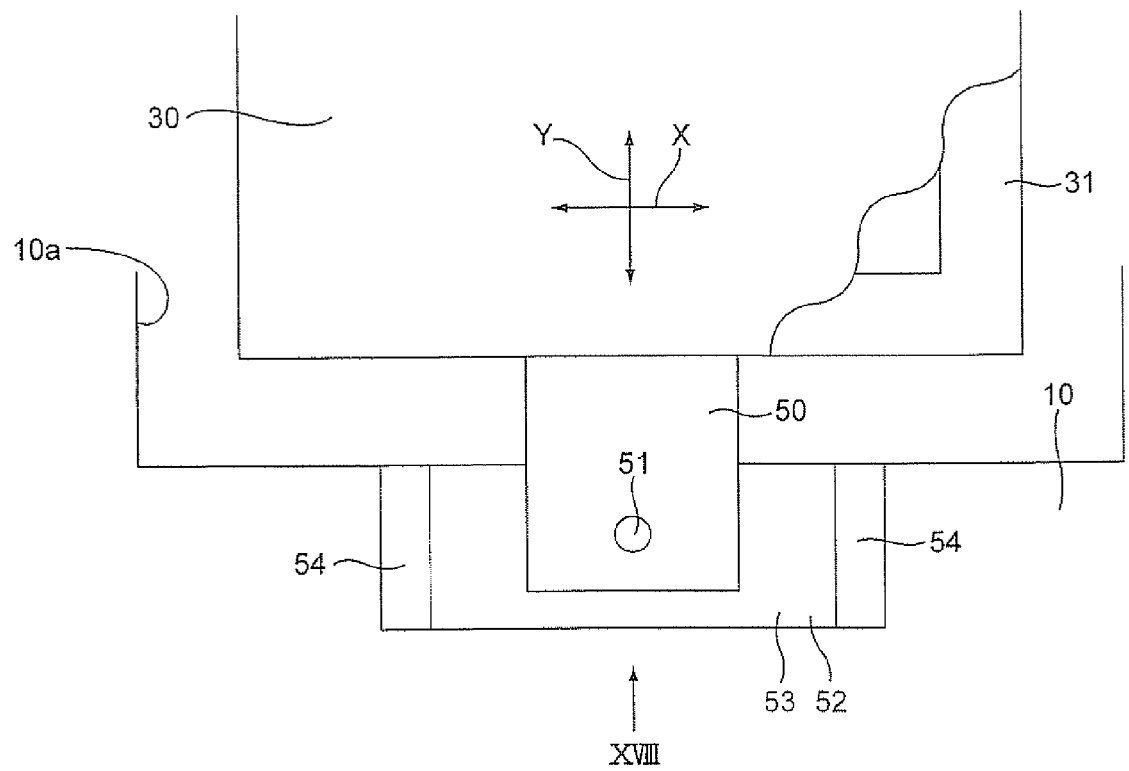
FIG. 17 is a back view of a camera shake correcting apparatus in an inoperative position with a removed circuit board, are moved yoke, and a removed leaf spring, according to a modified embodiment.
Figure 18:
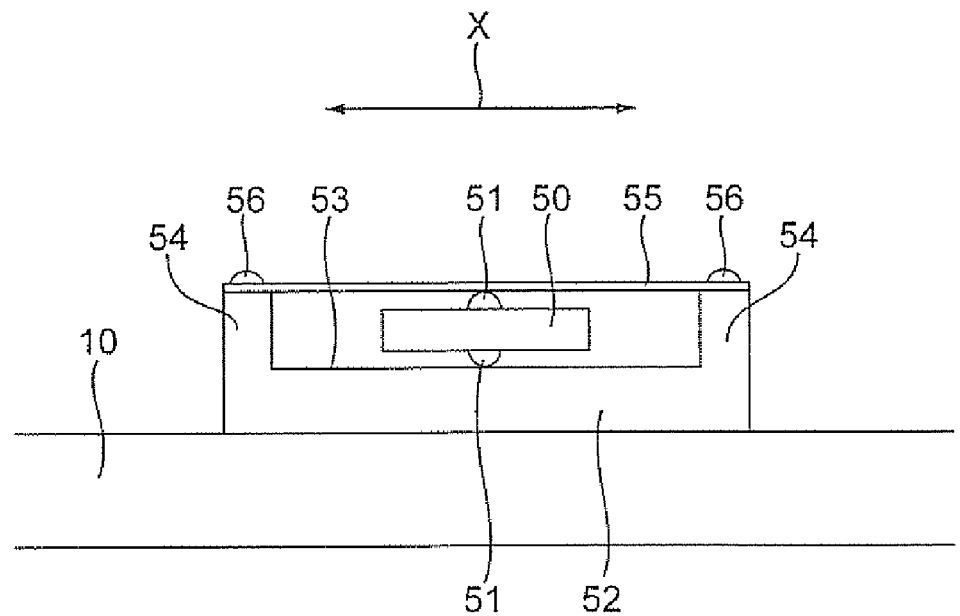
FIG. 18 is an enlarged bottom view of a main part viewed from the direction XVIII in FIG. 17.

FIGS. 17 and 18 show a modified embodiment in which the cover member 31 is provided on its lower surface with a projection 50 projecting downward, which is in the form of a plate parallel with the X and Y directions. The projection 50 is provided on its front and rear surfaces with semi spherical sliding members 51. A guide member (rotation restricting support portion) 52 which is generally U-shaped in section is secured to the lower end of the rear surface of the stationary support plate 10. The guide member 52 is provided with a guide surface 53 extending in a plane parallel with the X and Y direction, and rearwardly extending support portions 54 which are provided on the right and left sides of the guide surface 53. The projection 50 and the sliding members 51 are located between the right and left support portions 54. The height (i.e., the length in the forward/rearward direction) of the support portions 54 is substantially the same as the linear distance between the front end of the front sliding member 51 and the rear end of the rear sliding member 51. A leaf spring (rotation restricting support portion) 55 parallel with a plane extending in the X and Y directions bridges across the rear end surfaces of the left and right support portions 54 and is secured at the right and left ends thereof to the support portions 54 by a pair of securing screws 56. Due to the biasing force of the leaf spring 55, the vertex of the front sliding member 51 is always in sliding contact with the guide surface 53 and the vertex of the rear sliding member 51 is always in elastic contact with the front surface of the leaf spring 55.

In this modified embodiment, the cover member 31 (CCD 3) is movable in the X-direction relative to the Y-direction moving member 20, within the range in which the front and rear sliding members 51 are maintained in contact with the guide surface 53 and the leaf spring 55, respectively. Since the front and rear sliding members 51 are in contact with the guide surface 53 and the leaf spring 55 to always maintain the X-direction moving member (the cover member 31, the X-direction guide portion 34, the projection 50) so as to be parallel with the stationary support plate 10, the number of the components can be reduced and the structure can be simplified in comparison with the prior art.

Moreover, unlike the prior art, since no biasing force in a direction parallel with the optical axis O is applied to the X-direction moving member, no increase in the sliding resistance between the front and rear sliding members 51 and the guide surface 53 and the leaf spring 55 occurs. Thus, the X-direction moving member is moved smoothly with respect to the Y-direction moving member 20, and hence, the operability of the camera shake correcting apparatus 5 can be enhanced, as in the first and second embodiments.

Figure 19:
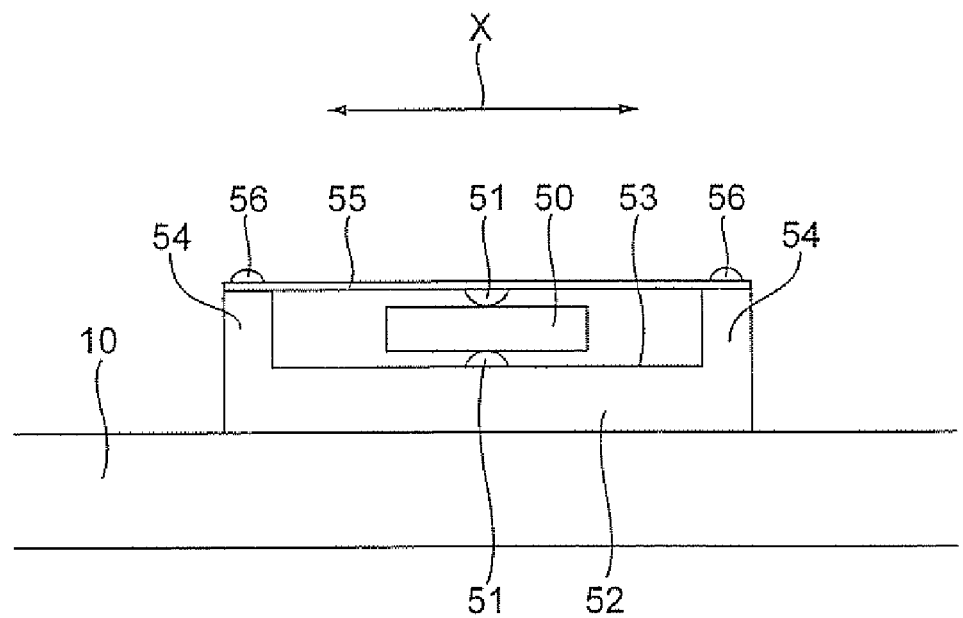
FIG. 19 is an enlarged bottom view, similar to FIG. 18, according to a modified embodiment.

FIG. 19 shows another modified embodiment of the camera shake correcting apparatus shown in FIGS. 17 and 18. In this modified embodiment, the front and rear sliding members 51 are secured to the front surface of the leaf spring 55 and the guide surface 53, respectively, rather than to the projection 50. The vertices of the front and rear sliding members 51 are always in sliding contact with the front and rear surfaces of the projection 50 due to the biasing force of the leaf spring 55. In this embodiment, the mode of operation and the same effect as in the apparatus shown in FIGS. 17 and 18 can be obtained.

Figure 20:
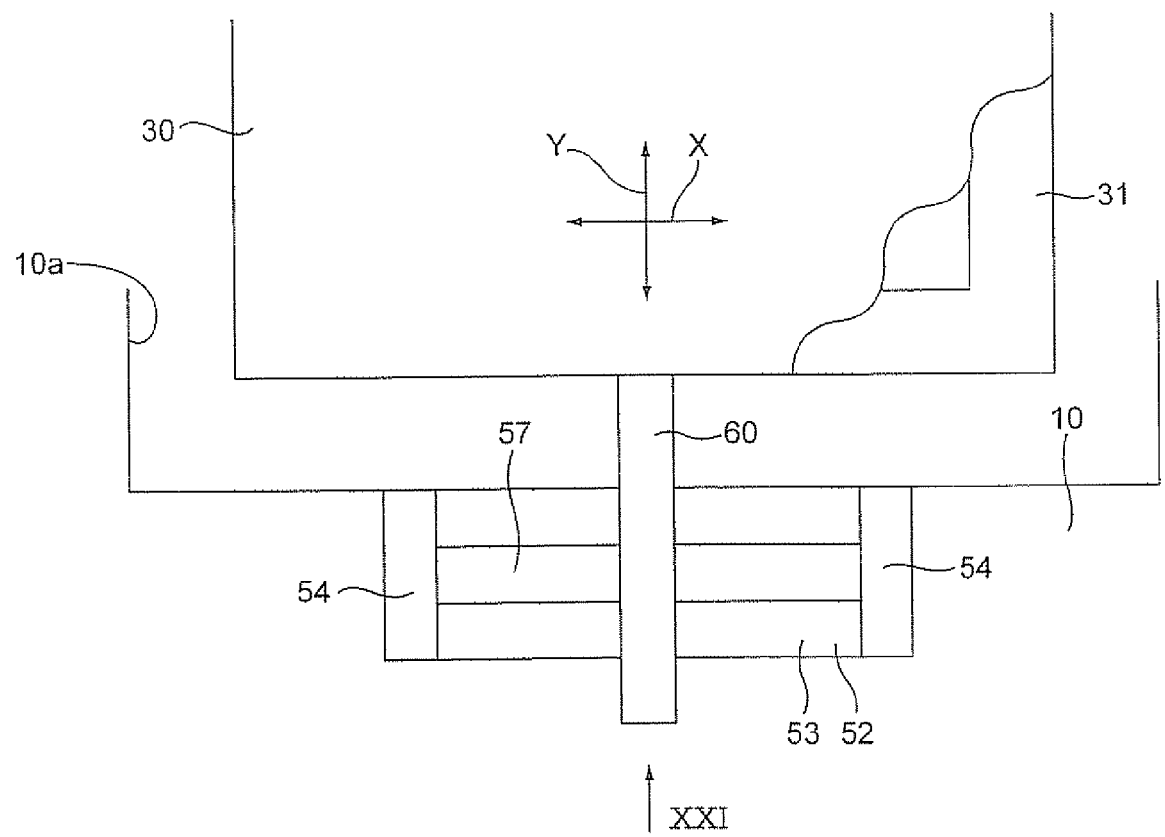
FIG. 20 is a rear view, similar to FIG. 17, according to another modified embodiment.
Figure 21:
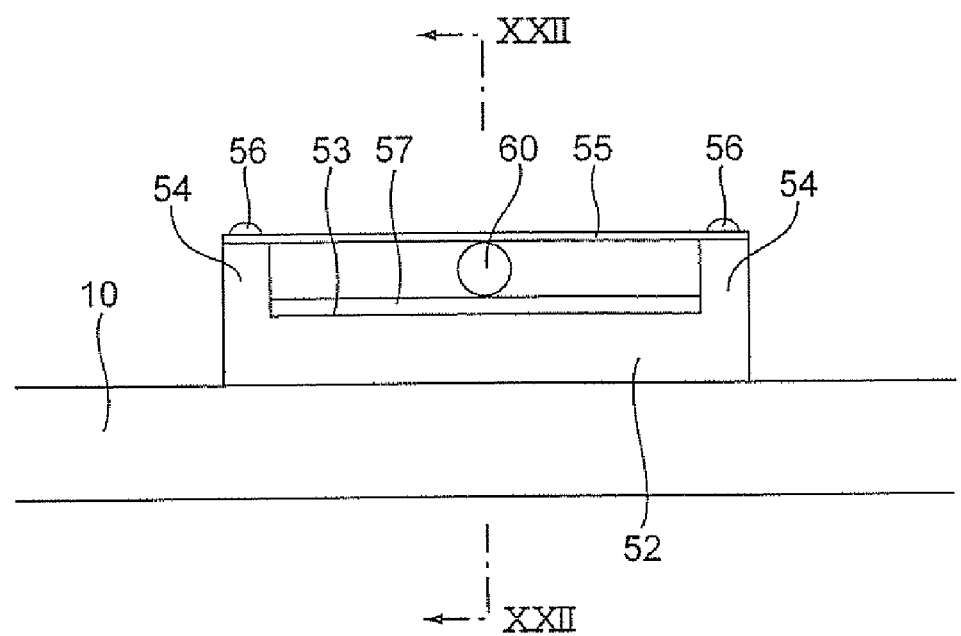
FIG. 21 is an enlarged bottom view of a main components of the modified embodiment of FIG. 20, viewed from the direction XXI in FIG. 20.
Figure 22:
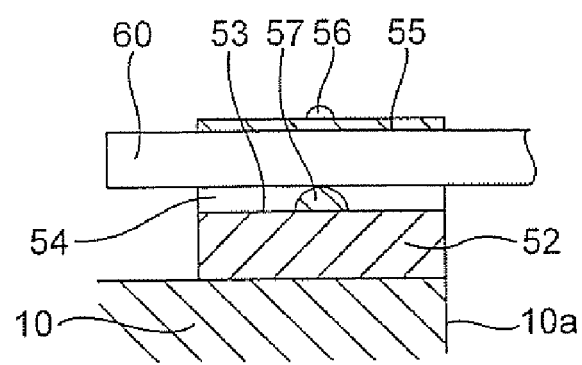
FIG. 22 is a sectional view taken along the line XXII-XXII in FIG. 21.

FIGS. 20 through 22 show another modified embodiment of the camera shake correcting apparatus of the present invention. In this embodiment, the cover member 31 is provided on its lower surface with a circular pillar member (projection) 60 whose axis extends in the Y-direction. A semi-circular pillar guide member (rotation restricting support portion) 57 having a semi-circular cross section and an axis extending in the X-direction is secured to the guide surface 53 of the guide member 52. The generatrix of the circular pillar member 60 extending in the Y-direction on the front side is always in sliding point contact with the generatrix of the semi-circular pillar guide member 57 extending in the X-direction on the rear side, and the generatrix of the circular pillar member 60 extending in the Y-direction on the rear side is always in sliding line contact with the front surface of the leaf spring (rotation restricting support) 55, due to the biasing force of the leaf spring 55.

In this embodiment, the cover member 31 (CCD 3) is movable in the X-direction relative to the Y-direction moving member 20, within the range in which the circular pillar member 60 is maintained in contact with the leaf spring 55 and the semi-circular pillar guide member 57. Since the pillar member 60 is in contact with the leaf spring 55 and the semi-circular pillar guide member 57 to always maintain the X-direction moving member (the cover member 31, the X-direction guide portion 34, the pillar member 60) so as to be parallel with the stationary support plate 10, the number of the components can be reduced and the structure can be simplified in comparison with the prior art.

Moreover, in this embodiment, since the pillar member 60 and the semi-circular pillar guide member 57 are in point contact and the pillar member 60 and the leaf spring 55 are in line contact, the sliding resistance between the projection (pillar member 60) and the rotation restricting support portion (the leaf spring 55 and the semi-circular pillar guide member 57) is reduced in comparison with the first and second embodiment or the modified embodiments mentioned above, and accordingly, the operability of the camera shake correcting apparatus 5 can be further enhanced.

In the first embodiment, the X-direction guide rod 17 is provided on the stationary support plate 10 (via the right and left support portions) and the projection 35 is provided on the X-direction moving member (cover member 31). However, it is alternatively possible to provide the projection 35 on the stationary support plate 10 and the X-direction guide rod 17 on the X-direction moving member (cover member 31), respectively.

In the second embodiment, it is possible to secure a Y-direction guide rod (not shown), extending in the Y-direction and separate from the Y-direction rod portion 21, to the stationary support plate 10, so that the Y-direction guide rod is relatively movably fitted in the X-direction elongated hole 41; or to provide the Y-direction guide rod on the X-direction moving member (cover member 31) and provide the X-direction elongated hole 41 on the stationary support plate 10 (via the guide projection 40), so that the Y-direction guide rod is relatively movably fitted in the X-direction elongated hole 41.

Furthermore, in the modified embodiment shown in FIGS. 17 through 19, it is possible to secure the projection 50 to the stationary support plate 10 and provide the guide member 52 (and the leaf spring 55) on the X-direction moving member (cover member 31). Also, in the modified embodiment shown in FIGS. 20 through 22, it is possible to provide the circular pillar member 60 on the stationary support plate 10 and provide the guide member 52 (and the leaf spring 55) on the X-direction moving member (cover member 31).

Figure 23:
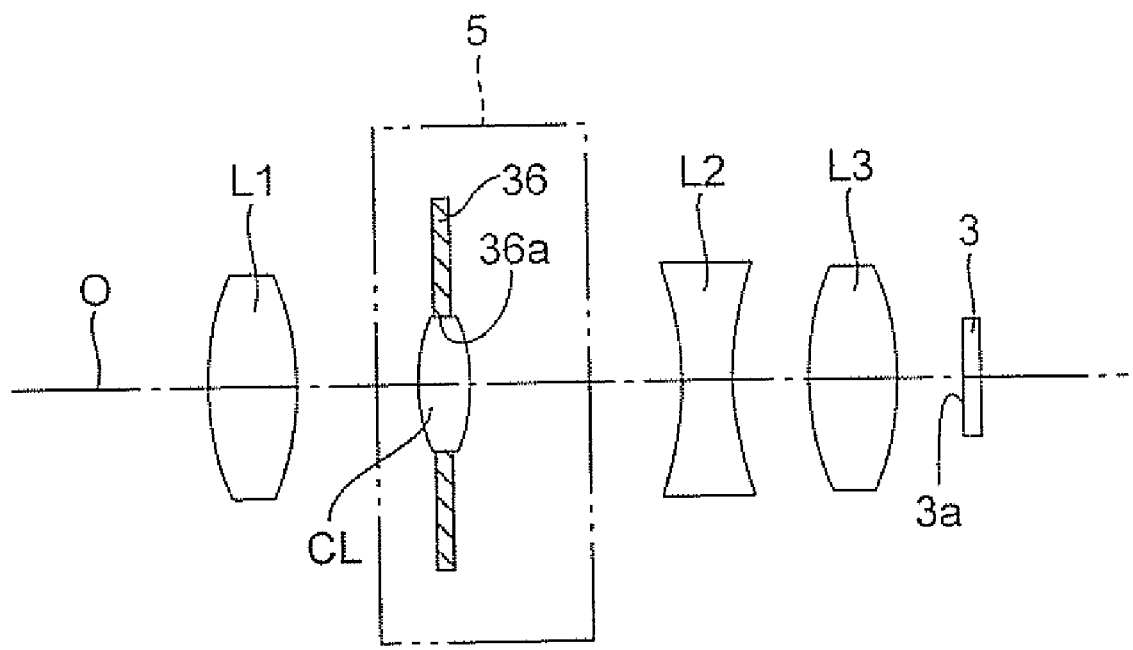
FIG. 23 is an axial cross sectional view of a portion of another modified embodiment of the camera shake correction apparatus according to the present invention, wherein a correcting lens is provided.

Although the CCD 3 is secured to the circuit board 36, so that the CCD 3 is moved in the X and Y directions to correct camera shake in each of the embodiments and modified embodiments, as shown in FIG. 23, it is alternatively possible to provide the CCD 3 behind the stationary support plate 10 and form a circular mounting hole 36a in the circuit board 36, so that a correcting lens CL is fitted and secured in the mounting hole 36a, perpendicular to the optical axis O. In this alternative, the correcting lens CL (the camera shake correcting apparatus 5) is located between the lens L1 and the lens L2 or between the lens L2 and the lens L3. Camera shake can be corrected by linearly moving the correcting lens CL in the X and Y directions. Furthermore, the camera shake correcting apparatus using such a correcting lens CL but having no CCD 3 can be applied to a silver-salt film camera.

Moreover, in the first and second embodiments, the yokes YX and YY (and the magnets MX and MY) are provided on the stationary support plate 10, and the coils CX and CY are provided on the circuit board 36. Alternatively, it is possible to provide the coils CX and CY on the stationary support plate 10 and provide the yokes YX and YY (and the magnets MX and MY) on the circuit board 36.

Furthermore, members other than the magnet MX, the yoke YX and the X-direction drive coil CX or the magnet MY, the yoke YY and the Y-direction drive coil CY, can be used for the X-direction actuator or the Y-direction actuator.

In the above discussion, the stage apparatus of the present invention is applied to the camera shake correcting apparatus 5, however, the application of the stage apparatus of the present invention is not limited to the camera shake correcting apparatus. The stage apparatus can be applied to various apparatuses which are linearly movable in X and Y directions.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stage apparatus comprising:
   a stationary support plate;
   a Y-direction moving member including a Y-direction rod portion extending in a Y-direction, parallel with the stationary support plate, and an X-direction rod portion connected to the Y-direction rod portion and extending in a X-direction parallel with the stationary support plate and extending perpendicular to said Y-direction, said Y-direction moving member being supported by said stationary support plate so as to relatively move in the Y-direction;
   an X-direction moving member which is supported by said X-direction rod portion of said Y-direction moving member so as to relatively move in said X-direction;
   wherein one of said X-direction moving member and said stationary support plate is provided with a projection, and the other of said X-direction moving member and said stationary support plate is provided with a rotation restriction support portion which supports said projection to move in a plane parallel with the stationary support plate relative to said other of the X-direction moving member and the stationary support plate and which prevents rotation of the X-direction moving member about the X-direction rod portion.

2. The stage apparatus according to claim 1, wherein said rotation restriction support portion comprises a guide rod extending parallel with said stationary support plate, said projection being provided with an elongated hole in which said guide rod is fitted so as to relatively move in the X-direction so that said X-direction moving member and said stationary support plate are relatively movable in said X-direction and said Y-direction.

3. The stage apparatus according to claim 2, wherein said guide rod comprises an X-direction guide rod extending in said X-direction, and said elongated hole comprises a Y-direction elongated hole which is longer than a width of said X-direction guide rod in said Y-direction, wherein said X-direction guide rod is fitted in said Y-direction elongated hole so as to relatively move in said X-direction and said Y-direction.

4. The stage apparatus according to claim 2, wherein said guide rod comprises said Y-direction rod portion and said elongated hole comprises an X-direction elongated hole which is longer than the Y-direction rod portion in the X-direction, wherein said Y-direction rod portion is fitted in said X-direction elongated hole to relatively move in the X-direction.

5. The stage apparatus according to claim 1, wherein said rotation restriction support portion comprises a leaf spring and a guide member, which extend parallel with said stationary support plate, wherein one surface of said projection is in sliding contact with said leaf spring and the other surface of said projection is in sliding contact said guide member, so that said projection is provided in between said leaf spring and said guide member so as to be relatively movable in said X-direction and said Y-direction.

6. The stage apparatus according to claim 5, wherein said projection is provided on front and rear surfaces thereof with sliding members, wherein one of said sliding members is in sliding contact with one of said leaf spring and said front surface of said projection, and the other of said sliding members is in sliding contact with one of said guide member and said rear surface of said projection.

7. The stage apparatus according to claim 1, wherein said stationary support plate comprises a Y-direction guide hole in which said Y-direction rod portion of said Y-direction moving member is guided to slide in the Y-direction, and a Y-direction elongated hole which supports a free end of said X-direction rod portion of said Y-direction moving member so as to relatively move in the Y-direction and which prevents rotation of the X-direction rod portion about the Y-direction rod portion.

8. The stage apparatus according to claim 1, wherein said X-direction moving member comprises an X-direction guide hole via which said X-direction rod portion is fitted so that said X-direction moving member is supported thereby to linearly move in the X-direction.

9. The stage apparatus according to claim 1, further comprising a Y-direction actuator for driving the Y-direction moving member in the Y-direction, and an X-direction actuator for driving the X-direction moving member in the X-direction.

10. The camera shake correcting apparatus using a stage apparatus according to claim 9, comprising:
- a camera in which said stage apparatus is incorporated;
- an image pickup device secured to a front surface of said X-direction moving member and having an image pickup surface located at an imaging plane of an optical system of said camera;
- a shake detection sensor for detecting camera shake of said camera; and
- a control device for driving said X-direction actuator and said Y-direction actuator to correct said camera shake detected by said shake detection sensor.

11. The camera shake correcting apparatus using a stage apparatus according to claim 9, comprising:
- a camera in which the stage apparatus is incorporated;
- a correction lens positioned perpendicularly to an optical axis of an optical system of the camera and secured to said X-direction moving member in front of an image forming surface for correcting camera shake;
- a shake detection sensor for detecting said camera shake; and
- a control device for driving said X-direction actuator and said Y-direction actuator to correct said camera shake detected by said shake detection sensor.

* * * * *